UNITED STATES PATENT OFFICE.

ALEXANDER IMSCHENETZKY, OF ST. PETERSBURG, RUSSIA.

FIREPROOF AND INSULATING MATERIAL.

SPECIFICATION forming part of Letters Patent No. 629,567, dated July 25, 1899.

Application filed April 5, 1895. Serial No. 544,640. (No specimens.)

*To all whom it may concern:*

Be it known that I, ALEXANDER IMSCHENETZKY, a subject of the Emperor of Russia, and a resident of St. Petersburg, Russia, have invented certain new and useful Improvements in Fireproof and Insulating Materials, of which the following is a specification.

Various proposals have been made from time to time for producing a fireproof material or artificial stone by either mixing asbestos, with or without the addition of other material, together with water-glass or silicate-of-soda solution or by soaking a mass of asbestos, with or without other materials, in a silicate-of-soda solution, and it has been proposed to render such compounds of asbestos and water-glass more durable and impervious to moisture by treating the same with sulfuric and other acids for the purpose of converting the silicate of soda into insoluble silica. None of these methods have, however, proved to be of any practical value, because in the case of the simple mixture of water-glass with asbestos a material is obtained that is readily affected by moisture and is not fireproof, while if it be treated with acid only a small portion of the silicate on the surface of the compound will be converted into insoluble silica, which will effectually prevent the penetration of the acid into the interior of the mass, so that this will only be bound together by soluble silicate having no strength or resisting powers.

The present invention has for its object the production of a fireproof material that consists, mainly, of asbestos, the fibers of which are connected together by pure silica deposited in the colloidal form throughout the mass instead of only on the surface, whereby a strong fire-resisting material is obtained suitable for building and other purposes.

The invention consists, essentially, in treating the asbestos mass with a solution of silicate of soda mixed with an acid, such as sulfuric or hydrochloric acid, that in acting upon the silicate will cause silica to be separated in colloid form, but in which the acid is taken of such a low degree of strength that the separation of the colloidal silica will not take place until the mixture has had time to thoroughly penetrate into the mass. By this method of using so small a proportion of acid that the colloidal silica is only formed after a certain desired time the further important advantage is gained that the colloid at the moment of formation sets like glue and constitutes a strongly-cohering cementing medium for the asbestos fibers, whereas when the acid is used in larger proportion, as has always been heretofore done, so that the colloid forms rapidly, this when dry will crumble to powder and will consequently not form an effective cementing medium.

The method of manufacturing the said compound is as follows: Asbestos fiber, either alone or in combination with chalk, magnesia, oxids of metals, or the like inert substances, is mixed with a sufficient quantity of water to form a paste, which is then cast in molds or made into sheets somewhat like cardboard and slightly pressed and dried. If the mass is required to have increased waterproof properties, there may be added to the paste a quantity of powdered rosin, either in its natural state or after distilling off the volatile constituents. A bath is then prepared composed of one part of water-glass solution of $15°$ Baumé and one part of sulfuric acid of $2°$ Baumé, and the asbestos mass is then soaked in this mixture. After a time sufficient to allow the solution to penetrate thoroughly into the mass this assumes a gelatinous consistency in consequence of the formation of colloidal silica. The mass is then subjected to pressure and dried. Although the asbestos fiber will by this means be bound together to such a degree by a single saturation with the solution and drying that it will withstand the action of boiling water, yet in order to increase its strength it is advantageous to repeat the saturation process two or more times, as the strength will be increased at each treatment. When a sufficient degree of strength has been attained, the blocks or other forms of the asbestos mass may be coated with paint, varnish, &c., and if rosin has been mixed with the mass this is heated, so as to melt the rosin, in order to effectually block up any pores, and if it be desired to insure a perfect waterproof nature the blocks or other forms may be heated to a higher degree for distilling off any volatile constituents that may have remained in the rosin. Before such heating the blocks may be saturated with a liquid waterproofing substance or one that melts at a lower temperature than rosin, provided such substance is capable of combining with the rosin under heating.

What I claim as my invention is—

1. The process for manufacturing fireproof compounds from asbestos and cementing together the asbestos fibers, which consists in first preparing a solution of alkaline silicate containing a small proportion of an acid that will effect the separation of silica in the colloid form from the solution only after some time, and then soaking bodies made of asbestos fiber in the said solution so that after the said bodies have become saturated therewith the silica will separate in a strongly-cohering colloidal form and thereby effectually cement the asbestos fibers together, substantially as described.

2. The process for manufacturing fireproof compounds from asbestos and cementing together the asbestos fibers, which consists in saturating articles made of asbestos in a silicate solution with which is mixed a proportion of acid that will only effect the separation of the silica from said solution in colloid form after the solution has thoroughly penetrated into the asbestos mass, thereby effectually cementing together the asbestos fibers, substantially as described.

In witness whereof I have hereunto signed my name in the presence of two subscribing witnesses.

ALEXANDER IMSCHENETZKY.

Witnesses:
N. TSCHEKALOFF,
ED. WANSCHEIDT.